US006377396B1

(12) United States Patent
Sun et al.

(10) Patent No.: US 6,377,396 B1
(45) Date of Patent: Apr. 23, 2002

(54) OPTICAL AMPLIFIERS WITH VARIABLE OPTICAL ATTENUATION FOR USE IN FIBER-OPTIC COMMUNICATIONS SYSTEMS

(75) Inventors: Yan Sun, Menlo Park, CA (US); Chia-Chi Wang, Hillsborough, NJ (US); Yongan Wu, San Jose; Jun Ye, Palo Alto, both of CA (US)

(73) Assignee: Onetta, Inc., Sunnyvale, CA (US)

( * ) Notice: Subject to any disclaimer, the term of this patent is extended or adjusted under 35 U.S.C. 154(b) by 3 days.

(21) Appl. No.: 09/705,760

(22) Filed: Nov. 6, 2000

Related U.S. Application Data
(60) Provisional application No. 60/235,406, filed on Sep. 26, 2000.

(51) Int. Cl.[7] .............................................. H04B 10/12
(52) U.S. Cl. ..................... 359/341.42; 359/341; 359/41
(58) Field of Search ........................ 359/341.41, 337.1, 359/337.11, 341.42

(56) References Cited

U.S. PATENT DOCUMENTS

| | | | |
|---|---|---|---|
| 5,260,816 A | 11/1993 | Edagawa et al. ........... 359/341 |
| 5,453,873 A | 9/1995 | Millar et al. ............... 359/341 |
| 5,513,029 A | 4/1996 | Roberts ...................... 359/177 |
| 5,838,487 A | 11/1998 | Nilsson et al. .............. 359/341 |
| 5,859,938 A | 1/1999 | Nabeyama et al. ........... 385/24 |
| 5,861,973 A | 1/1999 | Inagaki et al. .............. 359/341 |
| 5,900,969 A | 5/1999 | Srivastava et al. .......... 359/341 |
| 5,963,361 A | 10/1999 | Taylor et al. ............... 359/337 |
| 5,995,274 A | * 11/1999 | Sugaya ....................... 359/337 |
| 6,025,947 A | * 2/2000 | Sugaya ....................... 359/160 |
| 6,049,413 A | 4/2000 | Taylor et al. ............... 359/337 |
| 6,055,092 A | * 4/2000 | Sugaya ....................... 359/337 |
| 6,055,094 A | * 4/2000 | Shima ........................ 359/341 |
| 6,061,171 A | 5/2000 | Taylor et al. ............... 359/341 |
| 6,088,152 A | * 7/2000 | Berger ....................... 359/334 |

(List continued on next page.)

FOREIGN PATENT DOCUMENTS

| EP | 0 734 105 A2 | 9/1996 |
| WO | WO 11/14909 | 3/2000 |

OTHER PUBLICATIONS

Toba, H. et al. "A 100–Channel Optical FDM Six–Stage In–Line Amplifier Systemn Employing Tunable Gain Equalizaers." IEEE Photonics Tech Lett. vol. 5, No. 2, Feb. 1993, pp. 248–250.*

Ford, J.E. et al. "Micromechanical Fiber–Optic Attenuator with 3 microsecond Response." J. Lightwave Tech. vol. 16, No. 9. Sep. 1998. pp. 1663–1670.*

Yu. A. and O'Mahony, J.O. "Analysis of dual–stage ebrium–doped fibre amplifiers with passive equalization filters." IEE Proc. Optoelectronics. Jun. 1999, vol. 146, No. 3, pp. 153–158.*

(List continued on next page.)

Primary Examiner—Thomas H. Tarcza
Assistant Examiner—Andrew R. Sommer
(74) Attorney, Agent, or Firm—G. Victor Treyz; Morgan, Lewis & Bockius LLP (57) ABSTRACT

Optical amplifiers with variable optical attenuators that are adjusted using a sublinear control scheme are provided. Instead of increasing the attenuation of the optical attenuator by Y dBs for each desired Y dBs in decreased optical amplifier gain, the attenuation of the variable optical attenuator is increased by less than Y dBs. This sublinear control scheme improves the noise figure performance of the optical amplifier at the expense of increased gain ripple. The overall performance of the optical amplifier may be improved, particularly in conditions in which the attenuations produced by the variable optical attenuator are relatively large.

23 Claims, 9 Drawing Sheets

U.S. PATENT DOCUMENTS

| | | | |
|---|---|---|---|
| 6,091,539 A * | 7/2000 | Koska | 359/341 |
| 6,094,298 A | 7/2000 | Luo et al. | 359/346 |
| 6,134,047 A | 10/2000 | Flood et al. | 359/341 |
| 6,144,485 A * | 11/2000 | Sugaya | 359/337 |
| 6,198,572 B1 | 3/2001 | Sugaya et al. | 359/337 |
| 6,201,636 B1 * | 3/2001 | Noda | 359/337 |
| 6,215,581 B1 | 4/2001 | Yadlowsky | 359/337 |
| 6,222,962 B1 | 4/2001 | Nilsson | 385/37 |
| 6,275,329 B1 * | 8/2001 | Sieben | 359/337.15 |
| 6,288,836 B1 * | 9/2001 | Kawasaki | 359/341.42 |

OTHER PUBLICATIONS

Ramamurthy, B. et al. "minimizing the Number of Optical Amplifiers Needed to Support a Multi–Wavelengths Optical LAN/MAN."IEEE publication, 1997.*

Antoniades, N. et al. "Simulation of ASE Noise Accumulation in a Wavelength Add–Drop Multiplexer Cascade." IEEE Photonics Tech. Lett. vol. 9, No. 9, Sep. 1997. pp. 1274–1276.*

Delavaux et al. "Optimized Two–Stage In–Line Balanced Optical Amplifier Design" Academic Press, p. 239–243 (1995).

Sun et al. "Optical Fiber Amplifiers for WDM Optical Networks" Bell Labs Journal, p. 187–206, Jan.–Mar., 1999.

Sun et al. "Ultra Wide Band Ebrium–Doped Fiber Amplifier with 80nm of Bandwidth" OSA Trends in Optics and Photonics, vol. 16 1997.

Ono et al. "Automatic Gain Control in Silica–Based EDFA with over 50nm Flat Gain Bandwidth usin an all Optical Feedback Loop" $10^{th}$ Optical Amplifiers and their Applications Technical Digest, Jun. 9–11, 1999.

Kakui et al. "Dynamic–Gain–Tilt–Free Long–Wavelength Band Ebrium Doped Fiber Amplifiers Utilizing Temperature Dependent Characteristics of Gain Spectrum" $25^{th}$ Optical Fiber Communication Conference, Technical Digest, p. 6–8, (Mar. 8, 2000).

Masuda "Review of Wideband Hybrid Amplifiers" $25^{th}$ Optical Fiber Communication Conference, Technical Digest, p. 2–4, (Mar. 7, 2000).

Lewis et al. "Low–Noise High Gain Dispersion Compensating Broadband Raman Amplifier" $25^{th}$ Optical Fiber Communication Conference, Technical Digest, p. 5–7, (Mar. 7, 2000).

Sun et al. "Average Inversion Level, Modeling and Physics of Ebrium–Doped Fiber Amplifiers" IEEE Journal of Selected Topics in Quantum Electronics, vol. 3, No. 4, Aug. 1997.

* cited by examiner

OPTICAL AMPLIFIERS WITH VARIABLE OPTICAL ATTENUATION FOR USE IN FIBER-OPTIC COMMUNICATIONS SYSTEMS

This application claims the benefit of provisional patent application Ser. No. 60/235,406, filed Sep. 26, 2000.

BACKGROUND OF THE INVENTION

The present invention relates to fiber-optic communication systems, and more particularly, to optical amplifiers for use in fiber-optic communications systems.

Optical amplifiers such as erbium-doped fiber amplifiers are used in fiber-optic communications systems to amplify optical signals. Optical amplifiers are sometimes used as power boosters to increase the power of optical signals being launched from a transmitter. Optical amplifiers are also used as line amplifiers to compensate for optical signal attenuation in spans of transmission fiber. Optical amplifiers may also be used as preamplifiers to improve receiver sensitivity.

Some optical amplifiers have adjustable gain to ensure flexibility. Erbium-doped fiber amplifiers, for example, may use variable optical attenuators to adjust their optical gain. As the optical attenuation of a variable optical attenuator is increased, the optical gain of the amplifier decreases.

Variable optical attenuators have previously been used to adjust gain using a linear "dB to dB" ratio. With this type of scheme, one adjusts the variable optical attenuator to produce X dBs of loss to decrease the gain of an optical amplifier by X dBs. As a result, the tilt or gain ripple of the optical amplifier does not change when the optical amplifier gain is adjusted. The entire gain spectrum shifts without changing the relative gain at different wavelengths.

It is an object of the present invention to provide arrangements for adjusting the gain of optical amplifiers using sublinear attenuation control.

SUMMARY OF THE INVENTION

This and other objects of the invention are accomplished in accordance with the present invention by providing optical amplifiers with variable optical attenuators that are adjusted using a sublinear control scheme. Instead of increasing the attenuation of the optical attenuator by Y dBs for each desired Y dBs in decreased optical amplifier gain, the attenuation of the variable optical attenuator is increased by less than Y dBs. This sublinear control scheme results in a tilt or ripple in the gain of the optical amplifier. However, the noise figure of the optical amplifier improves. As a result, the overall performance of the optical amplifier is improved, particularly in conditions in which the attenuations produced by the variable optical attenuator are relatively large.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
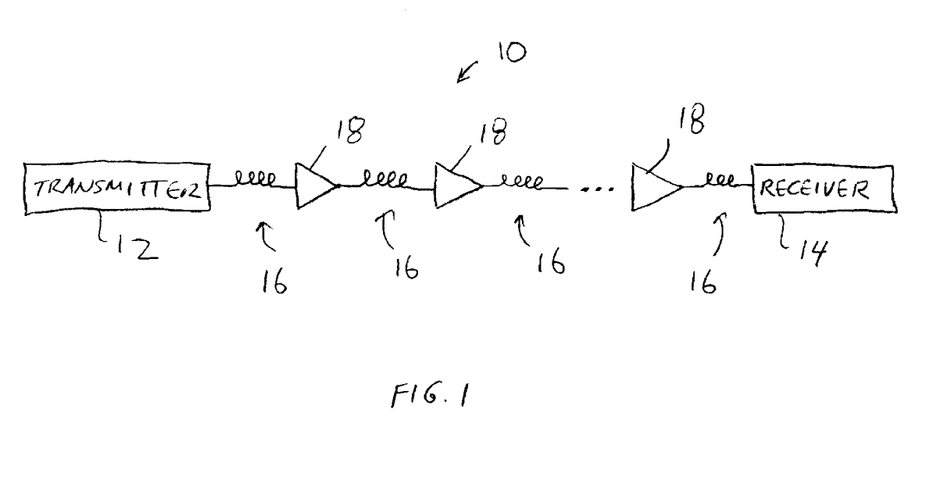
FIG. 1 is a schematic diagram of an illustrative optical communications system link in accordance with the present invention.

An illustrative optical communications link 10 in accordance with the present invention is shown in FIG. 1. A transmitter 12 may transmit information to a receiver 14 over a series of fiber links 16. Each fiber link may include a span of optical transmission fiber. Fiber links 16 may be on the order of 80 km in length for use in long-haul networks. This is merely illustrative. Fiber spans 16 may be any suitable length for use in an optical communications network.

As optical signals travel along the optical fibers 16, signal strength is attenuated. Accordingly, optical amplifiers 18 are used to amplify the optical signals between successive spans of fiber.

Communications link 10 may be used to support wavelength-division multiplexing arrangements in which multiple communications channels are provided using multiple wavelengths of light. For example, links such as link 10 may be used to support a system with 40 channels, each using a different optical carrier wavelength. Optical channels may be modulated at, for example, approximately 10 GHz (OC-192).

Figure 2:
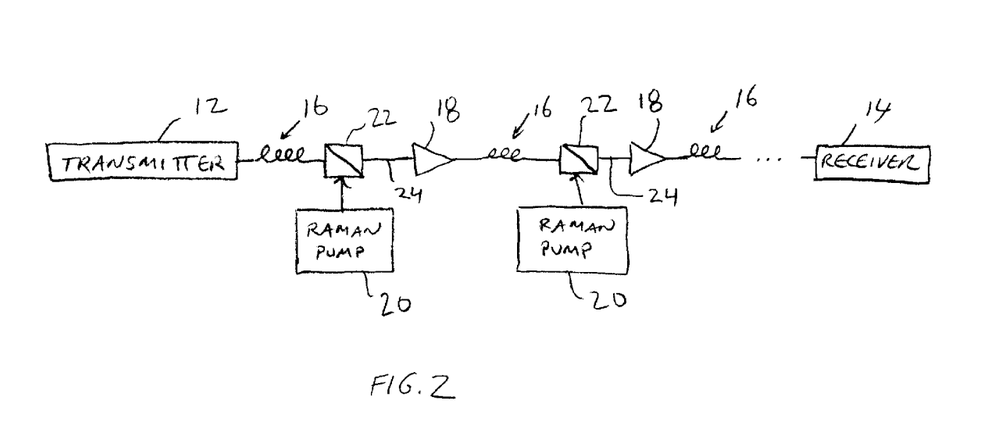
FIG. 2 is a schematic diagram of another illustrative optical communications system link in accordance with the present invention.

If desired, amplifiers 18 may be used in Raman-assisted optical communications systems. An illustrative Raman-assisted transmission arrangement is shown in FIG. 2. One or more Raman pumps 20 (e.g., diode lasers operating at 1455 nm) may be used at the end of each span 16 of transmission fiber 16. Spans 16 may be 80 km in length or any other suitable transmission length. Raman pumps 20 may be coupled into the fiber 16 using pump couplers 22. Relatively short lengths of fiber 24 may be used to connect pump couplers 22 to amplifiers 18.

With the arrangement of FIG. 2, Raman pumps 20 produce gain in the spans of transmission fiber 16, so that the total attenuation across each fiber span 16 is minimized.

Figure 3:
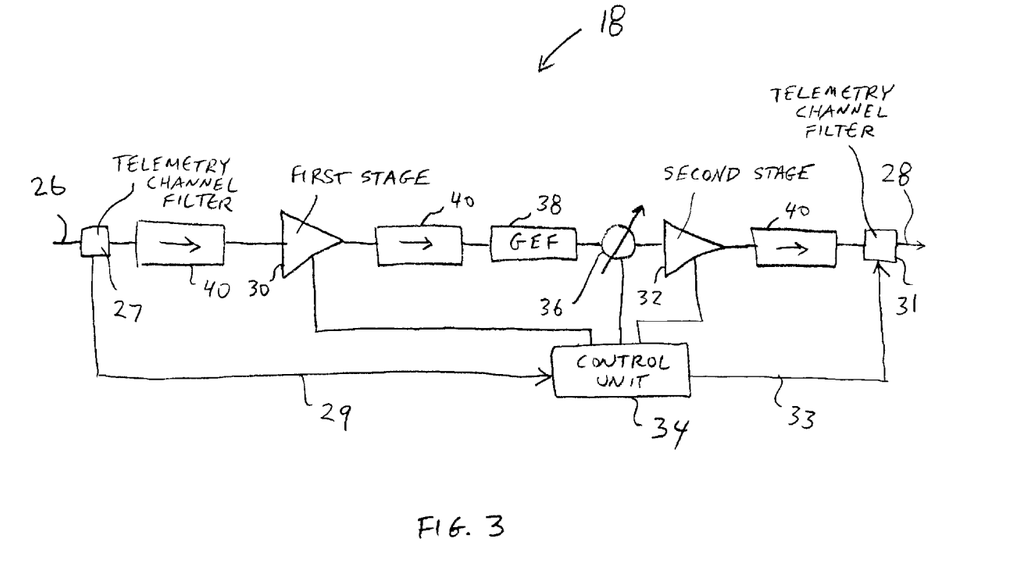
FIG. 3 is a schematic diagram of an illustrative optical amplifier having a variable optical attenuator for adjusting the gain of the amplifier in accordance with the present invention.

An illustrative amplifier 18 is shown in FIG. 3. Optical signals from a span of transmission fiber 16 (e.g., an 80 km span) may be provided to input 26. Amplifier 18 may be used to amplify the optical signals on each of the 40 separate channels. The amplified output of amplifier 18 may be provided at output 28.

Amplifier 18 may use multiple stages, each based on an individual rare-earth-doped fiber amplifier module. For example, amplifier 18 may include first and second erbium-doped fiber amplifier modules 30 and 32. Modules 30 and 32 may be monitored and controlled using a control unit 34. Control unit 34 may use any suitable control electronics such as microprocessor-based control electronics to provide monitoring and control functions for amplifier 18.

Control unit 34 may perform monitoring and control functions including the control of variable optical attenuator 36. Variable optical attenuator 36 may be any suitable optical attenuator with an attenuation level that may be controlled (e.g., electrically). Control unit 34 may also include communications circuitry that allows control unit 34 to communicate with other control equipment in the network.

Any suitable arrangement may be used to allow control unit 34 to communicate with network control equipment. As an example, a telemetry channel may be provided using a particular wavelength of light. Control unit 34 may have receiver and transmitter components that allow control unit 34 to receive and transmit optical signals for the telemetry channel. A telemetry drop filter 27 may be used to separate the telemetry channel wavelength for such a telemetry channel from the 40 data channels provided at input 26. The separated transmissions may then be provided to control unit 34 over a short length of fiber 29. A telemetry add filter 31 may be used to provide telemetry channel transmissions at the telemetry channel wavelength to the transmission fiber at output 28 from control unit 34. A short length of fiber 33 may be used to provide telemetry channel transmissions from control unit 34 to telemetry add filter 31. The telemetry channel may be used to convey monitored information from amplifiers 18 and control commands for amplifiers 18 to and from central offices and network management facilities and other network equipment.

First stage 30 of amplifier 18 may be configured to operate with a high inversion to provide a relatively low amplifier noise figure (NF). Second stage 32 of amplifier 18 may be used as a power amplifier. Variable optical attenuator 36 may be used to adjust the gain of amplifier 18. A gain equalization filter 38 may be inserted in the mid-stage of amplifier 18 to flatten the gain spectrum of amplifier 18.

For the calculations shown in FIGS. 4–7, it is assumed that the gain equalization filter is ideal and the erbium-doped fiber in stages 30 and 32 is homogeneous, so that with a linear variable optical attenuator control scheme the amplifier gain ripple is zero.

Isolators 40 may be used to eliminate light traveling in the backwards direction (i.e., towards input 26). Stages 30 and 32 may be pumped with 980 nm diode lasers or other suitable light sources propagating in the forward direction with the input signals provided at input 26. For the calculations associated with the results of FIGS. 4–7, the input loss, mid-stage loss (with a variable optical attenuator loss setting of 0 dB), and the output loss are taken as 1 dB, 2 dB, and 1 dB, respectively. The erbium-doped fiber lengths for the first and the second stages are assumed to be 10 and 15 meters, respectively. Signal wavelengths are assumed to be in the wavelength range from 1530.33 nm to 1561.42 nm with a 100 GHz spacing. There are 40 channels in total. The total signal output power is taken to be fixed at 16 dBm. These assumptions are merely illustrative. An amplifier of any suitable configuration may benefit from the sublinear variable optical attenuation control scheme.

Figure 4:
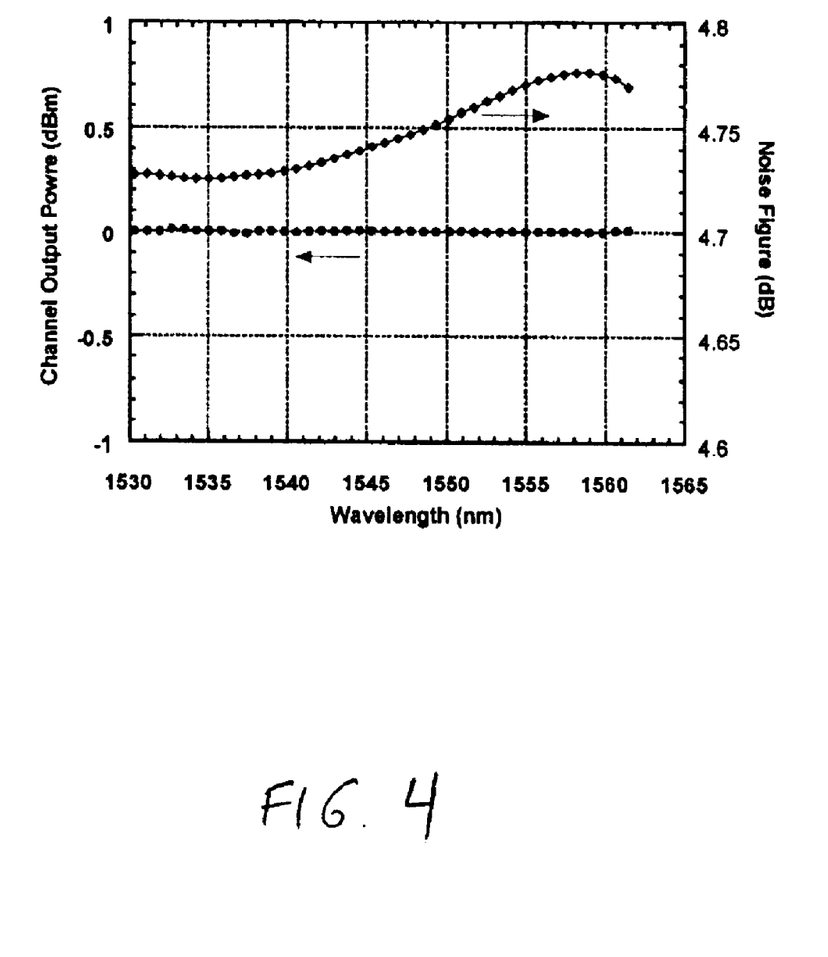
FIG. 4 is a graph showing the calculated output power per channel and the noise figure for an optical amplifier of the type shown in FIG. 1 assuming a −25 dBm/channel input and a variable optical attenuator loss of 0 dB.

When input signal power is −25 dBm/channel, the variable optical attenuator loss may be adjusted by control unit 34 to 0 dB, so that the gain of amplifier 18 is 25 dB. The pump power launched into the fiber coils of the first and the second stages 30 and 32 may be about 100 mW and 80 mW, respectively. The calculated amplifier gain ripple (or signal output power ripple) with this configuration is 0 dB (within the calculation error), as shown in FIG. 4. This is because an ideal gain equalization filter and homogeneous erbium-doped fiber amplifiers have been assumed for the calculations. The noise factor for this input condition is less than 4.8 dB for the worst channel.

When the signal input power is increased to −10 dBm/channel, one would normally increase the variable optical attenuator loss setting to 15 dB with a linear variable optical attenuator control scheme, so that the amplifier gain would be reduced to 10 dB.

Figure 5:
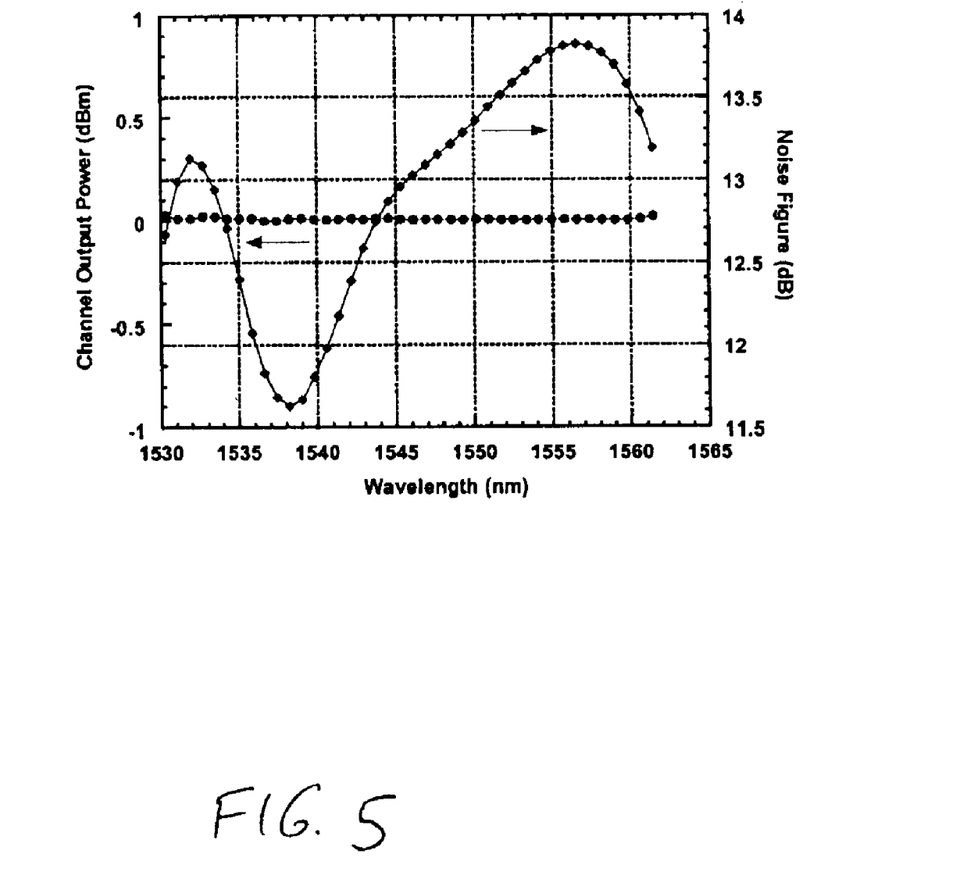
FIG. 5 is a graph showing the calculated output power per channel and the noise figure for an amplifier of the type shown in FIG. 1 operated with a linear variable optical attenuator control scheme and assuming a −10 dBm/channel input and a variable optical attenuator setting of 15 dB.

As shown in FIG. 5, with a linear control scheme the flatness of the output signal power spectrum can be maintained, although the pump power of the power stage needs to be increased slightly to provide this flat output power spectrum and to provide a total output power of 16 dBm. However, the noise figure is increased dramatically. The noise figure for the worst channel is now higher than 13.5 dB.

This high noise figure is due to a high loss in the mid-stage when the variable optical attenuator setting is increased. When the mid-stage loss is too high, the first gain stage can't provide enough gain for the signals to "overcome" the mid-stage loss. The noise factor of the second gain stage therefore contributes significantly to the overall amplifier noise factor. The noise factor contribution of the second gain stage is "weighted" by the compounded first stage gain and the mid-stage loss. As a result, when the mid-stage loss is high, the entire amplifier noise factor spectrum is strongly influenced by the mid-stage loss spectrum. This effect can be explained by the well-known amplifier noise factor cascading rules.

Figure 6:
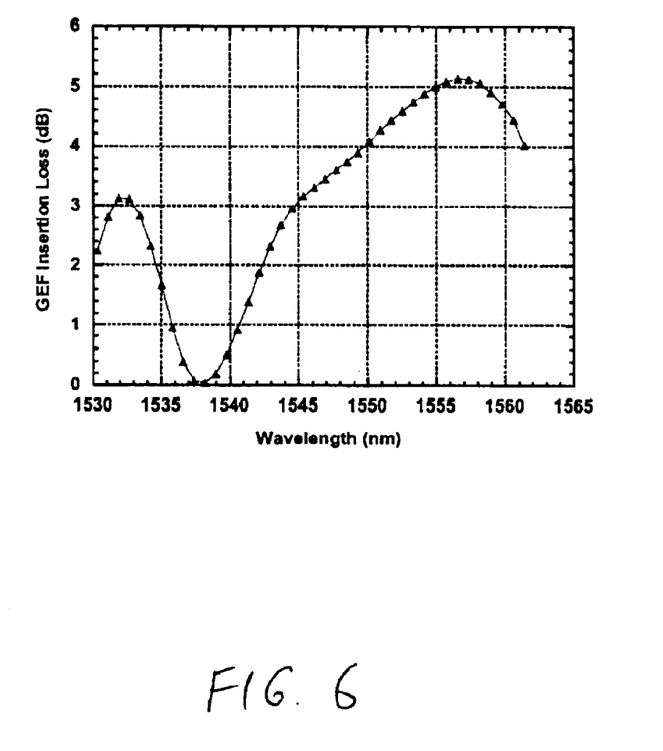
FIG. 6 is a graph showing the insertion loss spectrum for an illustrative gain equalization filter for use in an optical amplifier of the type shown in FIG. 1.

As shown in FIGS. 5 and 6, the spectral shape of the overall amplifier noise figure follows the spectral shape of the gain equalization filter insertion loss.

Figure 7:
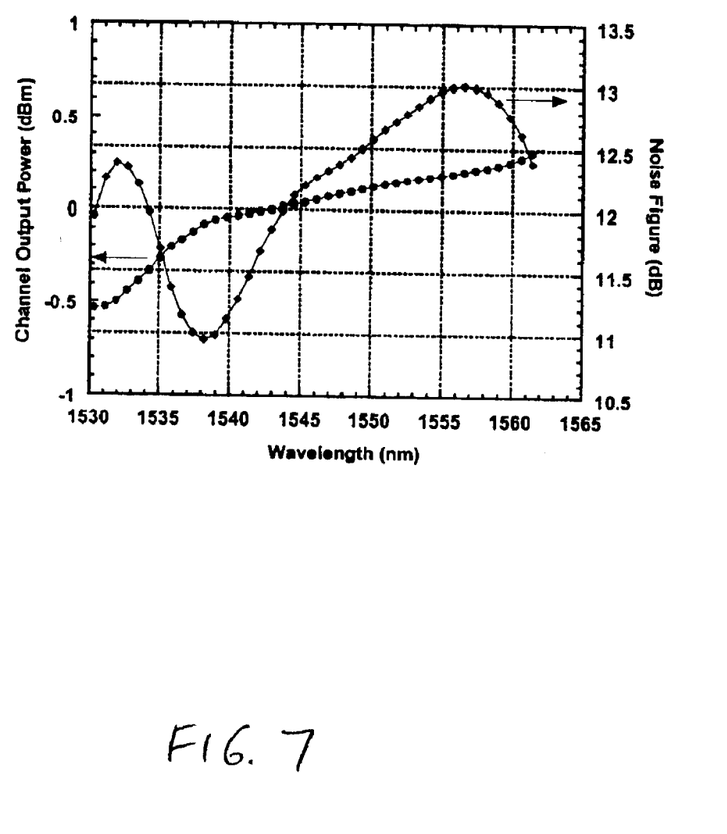
FIG. 7 is a graph showing the calculated noise figure and output power spectra for the illustrative amplifier of FIG. 1 assuming an input power of −10 dBm/channel and using a sublinear variable optical attenuation control scheme with a 14 dB variable-optical attenuator loss setting in accordance with the present invention.

With a sublinear variable optical attenuator control scheme, the variable optical attenuator loss setting may be less than 15 dB for an input power of −10 dBm/channel. The calculated noise factor and output power spectra of an amplifier 18 that has been adjusted using a sublinear variable optical attenuator control scheme for an illustrative variable optical attenuator loss of 14 dB are shown in FIG. 7. The pump power of power stage 32 may be adjusted so that the total output power of amplifier 18 is maintained at 16 dBm.

As shown in FIG. 7, the noise figure for the worst channel may be improved to about 13 dB by using the sublinear variable optical attenuator control scheme. Although the total output power is maintained at 16 dBm, there is a tilt in the output spectrum. However, the output power spectrum is tilted so that the longer-wavelength channels have higher output power than the lower-wavelength channels. As a result, the sublinear variable optical attenuator control scheme improves the optical signal-to-noise ratio of the channel with the worst noise figure in two ways—the noise figure is reduced and the output power is increased.

The sublinear variable optical attenuator control scheme may increase manufacturing yield when manufacturing optical amplifiers of the type shown in FIG. 1, particularly when using amplifier configurations with small noise figure margins and high gain ripple tolerance.

Amplifiers used in metropolitan networks tend to tolerate higher gain ripples. This is because relatively few amplifiers are used in any given chain and the accumulated gain ripple for such configurations is relatively low. Moreover, because of the large span variance in metropolitan networks, metro amplifiers may have gains and variable optical attenuator settings with large dynamic ranges. In these situations, the lower noise figures exhibited using sublinear variable optical attenuator control schemes rather than linear variable optical attenuator control schemes may be particularly beneficial. Sublinear variable optical attenuator control schemes provide a trade-off between gain ripple and noise figure that allows optical amplifiers to be configured to offer a balanced, high-yield product.

If desired, trade-off curves or relationships may be used to characterize the trade-off between the noise figure and the gain ripple for various input and pumping conditions. A system designer or automated network management and control software may use the trade-off curves or relationships to select an operating point for the variable optical attenuator that optimizes the optical signal-to-noise ratio for the system. The trade-off information may be stored in control unit 34 or other suitable equipment in the amplifier, so that the operating point may be selected locally in real time or may be stored in network computing equipment.

Control unit 34 may select the operating point or otherwise control the amplifier 18 autonomously, in response to control commands received over the telemetry channel, or using a combination of such arrangements. Control unit 34 may select the operating point in response to control signals received over the telemetry channel from a central office, network management facility, or other remote equipment. The trade-off information characterizing the trade-off between the noise figure and gain ripple and the information on the status of amplifier 18 may be provided to the central office, network management facility, or other remote equipment over the telemetry channel so that this information may be used by the central office, network management facility, or other equipment in making control (e.g., set-up) decisions for the operation of amplifier 18.

Figure 8:
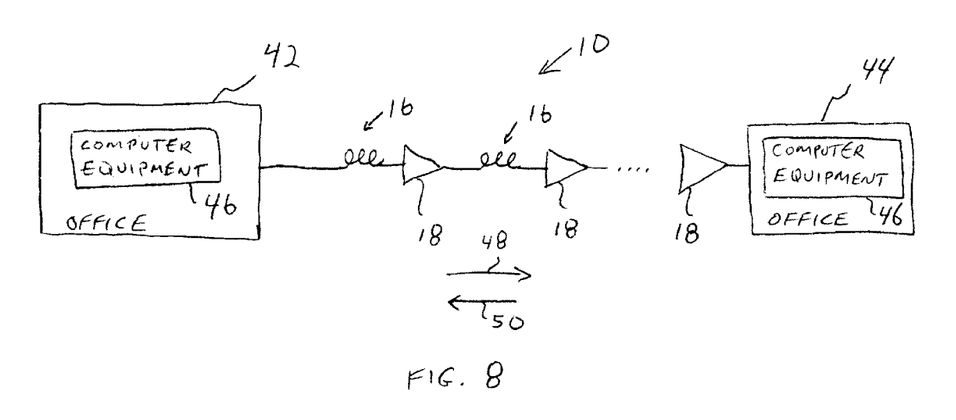
FIG. 8 is a schematic diagram showing how optical amplifiers may be controlled using network management software that is implemented using central offices.

As shown in FIG. 8, link 10 may originate and terminate at offices such as offices 42 and 44. Network management and control software may be implemented using computer equipment such as computer equipment 46. This software may be used to monitor the status of amplifiers 18 and other network components and may be used to adjust the settings of such components. For example, the settings of the variable optical attenuators 36 in each amplifier may be monitored. Information on the status of the variable optical attenuators 36 in link 10 may be passed in direction 48 using the telemetry channel. A telemetry channel on a parallel link or other suitable link between office 44 and 46 may be used to pass information in direction 50.

The settings of the variable optical attenuators 36 in amplifiers 18 may be adjusted by sending control commands to amplifiers 18 over the telemetry channel. For example, computer equipment 46 at office 42 may be used to transmit control commands to the amplifiers in link 10 in direction 48.

Figure 9:
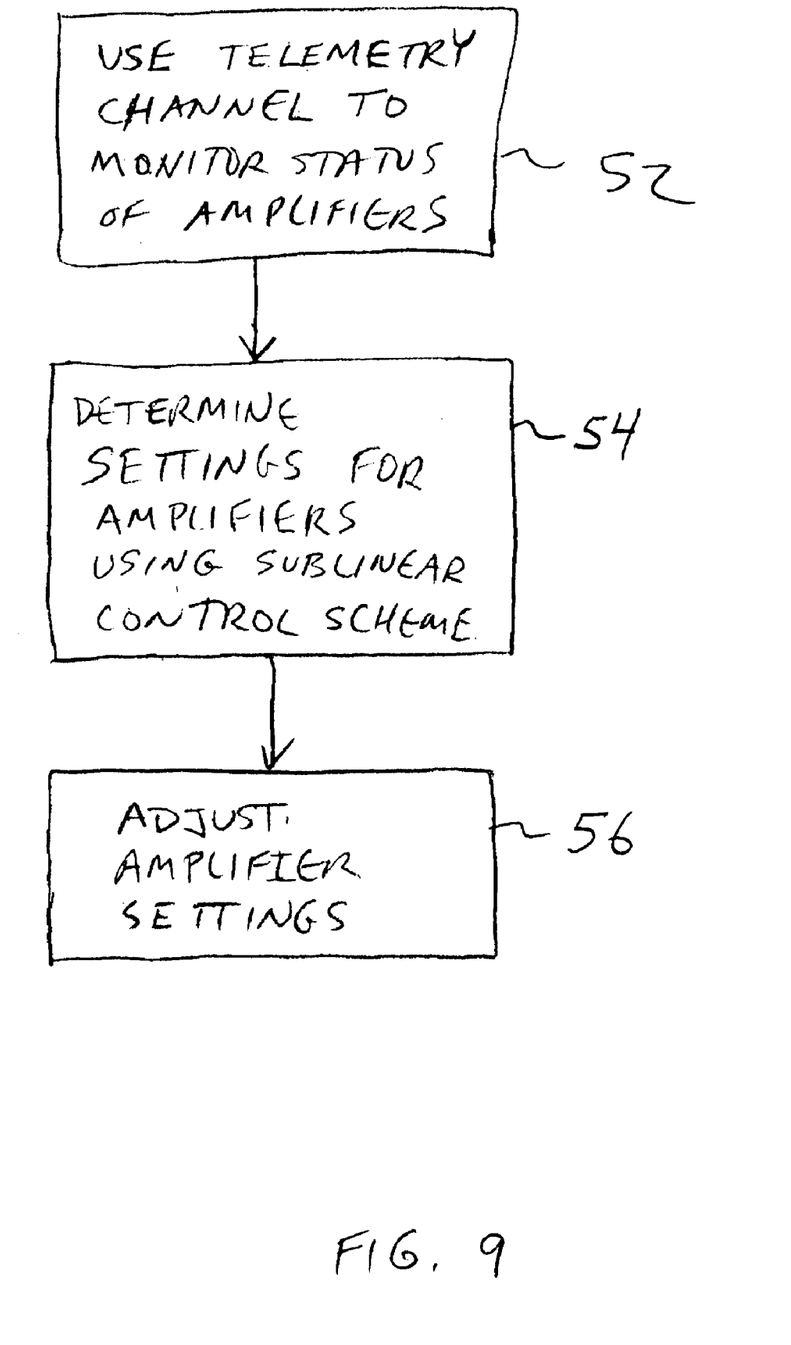
FIG. 9 is a flow chart of illustrative steps involved in using the sublinear variable optical attenuation control scheme in accordance with the present invention.

Illustrative steps involved in monitoring and controlling the states of amplifiers 18 using telemetry are shown in FIG. 9. At step 52, the telemetry channel may be used to monitor the status of amplifiers 18. For example, the control units 34 in each amplifier may be used to determine the status of the variable optical attenuator 36 and the status of stages 30 and 32. Information on the status of the components of amplifiers 18 may be passed to the telemetry channel using filter 31. This information may be gathered by the network management and control system (e.g., using computer equipment such as computer equipment 46).

At step 54, the network management and control system may determine which settings to use for some or all of amplifiers 18 using a sublinear control scheme. For example, computer equipment 46 may be used to determine the appropriate variable optical attenuator settings for some or all of amplifiers 18 in link 10 using a sublinear variable optical attenuator control scheme. The proper gain for each optical amplifier may be determined based on the information gathered at step 52 or based on measurements or other information on the characteristics of spans 16. For example, the proper gain for each amplifier may be determined based on knowledge of the lengths of each span 16 and the calculated values for the input power to each span or may be based on measured input power levels.

At step 56, the amplifier settings may be adjusted using the network management and control system. For example, computer equipment such as computer equipment 46 may be used to transmit sublinear variable optical attenuator settings to amplifiers 18 over the telemetry channel. These sublinear settings may be stored by the control unit 34 in each amplifier. After the network has been configured in this way, each amplifier may operate autonomously, using an operating point for the variable optical attenuator in that amplifier that was selected using the sublinear control scheme and that was provided to the amplifier using the telemetry channel when the system or that amplifier was configured. If desired, amplifiers 18 may be configured in the factory or in the field using the sublinear control scheme, in addition to or instead of configuring amplifiers 18 using the telemetry channel.

As demonstrated above, sublinear variable optical attenuator control schemes may be used in optical amplifiers to adjust the amplifier gain, particularly in optical amplifiers with gains having a large dynamic range (e.g., larger than 5 dB). Sublinear variable optical attenuator control schemes may be used in optical amplifiers to trade gain ripple for noise figure. Sublinear variable optical attenuator control schemes may be used in optical amplifiers to improve the optical signal-to-noise ratio. The amplifier stages in amplifiers 18 may be rare-earth-doped optical amplifiers such as erbium-doped optical fiber amplifiers or erbium-doped optical waveguide amplifiers. Sublinear variable optical attenuator control schemes may be used in erbium-doped fiber amplifiers or erbium-doped waveguide amplifiers that have a relatively high noise factor in the long-wavelength portion of the amplifier band. The high noise figure in these channels may, for example, be due to high gain equalization filter (gain flattening filter) insertion loss in these channels. Sublinear variable optical attenuator control schemes tilt the amplifier gain spectrum so that the high noise figure channels (the longer wavelength channels) have higher output power and therefore have an improved optical signal-to-noise ratio. The trade-off curve information that is used to characterize the trade-off between the noise figure and the gain ripple may be stored in each amplifier module (e.g., using control units such as control unit 34), so that the optimization of the amplifier ripple and noise figure may be accomplished using software control arrangements.

It will be understood that the foregoing is merely illustrative of the principles of this invention, and that various modifications can be made by those skilled in the art without departing from the scope and spirit of the invention. For example, optical signals may be amplified in any suitable wavelength range. Different pump arrangements and telemetry arrangements may also be used. Any suitable number of channels may be supported by the fibers in the system.

What is claimed is:

1. A method for controlling the operation of an optical amplifier having first and second gain stages and a variable optical attenuator between the first and second gain stages that may be adjusted to control gain spectrum tilt in the amplifier, wherein the amplifier amplifies optical data signals in a fiber-optic communications link having multiple amplifiers, the method comprising:

amplifying the optical data signals with the first and second gain stages to produce amplified optical data signals at a given level of gain for the optical amplifier; and adjusting the variable optical attenuator and controlling the gain of the amplifier using a sublinear variable optical attenuator control scheme in which the variable optical attenuator is adjusted sublinearly with respect to the gain.

2. The method defined in claim 1 wherein the fiber-optic communications link includes a span of transmission fiber that is coupled to the first gain stage, the method further comprising Raman-pumping the transmission fiber to amplify the optical data signals that are provided to the amplifier.

3. The method defined in claim 1 wherein the amplifier includes a control unit, the method further comprising using the control unit to control the variable optical attenuator.

4. The method defined in claim 1 wherein the fiber-optic communications link includes a span of transmission fiber that is coupled to the first gain stage and wherein the amplifier includes a control unit, the method further comprising:

Raman-pumping the transmission fiber to amplify the optical data signals that are provided to the amplifier; and using the control unit to control the variable optical attenuator.

5. The method defined in claim 1 further comprising using a telemetry channel to control the variable optical attenuator with the sublinear variable optical attenuator control scheme.

6. The method defined in claim 1 wherein the fiber-optic communications link includes a span of transmission fiber that is coupled to the first gain stage, the method further comprising:

Raman-pumping the transmission fiber to amplify the optical data signals that are provided to the amplifier; and using a telemetry channel to control the variable optical attenuator with the sublinear variable optical attenuator control scheme.

7. The method defined in claim 1 wherein the fiber-optic communications link is controlled using network equipment at a location other than the amplifier, the method further comprising using the network equipment to control the variable optical attenuator with the sublinear variable optical attenuator control scheme.

8. The method defined in claim 1 wherein the fiber-optic communications link includes a span of transmission fiber that is coupled to the first gain stage and wherein the fiber-optic communications link is controlled using network equipment at a location other than the amplifier, the method further comprising:

Raman-pumping the transmission fiber to amplify the optical data signals that are provided to the amplifier; and using the network equipment to control the variable optical attenuator with the sublinear variable optical attenuator control scheme over a telemetry channel.

9. The method defined in claim 1 wherein the amplifier includes a control unit in which trade-off information is stored that characterizes the trade-off between noise figure and gain ripple, the method further comprising using the control unit to control the variable optical attenuator based on the trade-off information.

10. The method defined in claim 1 further comprising using the amplifier in a metro network.

11. The method defined in claim 1 further comprising adjusting the amplifier gain by more than 5 dB using the sublinear variable optical attenuator control scheme.

12. The method defined in claim 1 further comprising adjusting the setting of the variable optical attenuator in a factory using a sublinear variable optical attenuator control scheme.

13. The method defined in claim 1 wherein the first and second gain stages are erbium-doped-fiber gain stages, the method further comprising amplifying the optical data signals using the erbium-doped fiber gain stages.

14. The method defined in claim 1 wherein the fiber-optic communications link includes a span of transmission fiber that is coupled to the first gain stage, the method further comprising selecting the gain for the amplifier using the variable optical attenuator based on knowledge of the length of the span of transmission fiber.

15. An optical communications system including a fiber-optic communications link having a plurality of transmission fibers, comprising:

a plurality of optical amplifiers in the fiber-optic communications link, each of which has first and second gain stages and a variable optical attenuator between the first and second gain stages that may be adjusted to control gain in that amplifier, wherein each amplifier amplifies optical data signals from one of the transmission fibers in the fiber-optic communications link; and a plurality of Raman pumps, each of which pumps a respective one of the transmission fibers, wherein the gain in each amplifier is controlled and the attenuation of each of the variable optical attenuators is controlled using a sublinear variable optical attenuator control scheme in which each of the variable optical attenuators is adjusted sublinearly with respect to each of the respective gains.

16. The optical communications system defined in claim 15 wherein each amplifier includes a control unit that controls the variable optical attenuator in that amplifier.

17. The optical communications system defined in claim 15 wherein each amplifier includes a control unit that uses a telemetry channel to control the variable optical attenuator using the sublinear variable optical attenuator control scheme.

18. The optical communications system defined in claim 15 wherein each transmission fiber is coupled to one of the first gain stages and wherein a telemetry channel is used to control the variable optical attenuator using the sublinear variable optical attenuator control scheme.

19. The optical communications system defined in claim 15 further comprising network equipment that controls the variable optical attenuator using the sublinear variable optical attenuator control scheme.

20. The optical communications system defined in claim 15 further comprising a control unit in each amplifier in which trade-off information is stored that characterizes the trade-off between noise figure and gain ripple, wherein the control unit controls the variable optical attenuator based on the trade-off information.

21. The optical communications system defined in claim 15 wherein the optical communications link is in a metro network.

22. The optical communications system defined in claim 15 wherein at least some of the gains of the amplifiers in the communications link differ from each other by more than 5 db.

23. The optical communications system defined in claim 15 wherein the first and second gain stages in each amplifier are erbium-doped-fiber gain stages.

* * * * *